(12) United States Patent
Petterson

(10) Patent No.: US 8,214,080 B2
(45) Date of Patent: Jul. 3, 2012

(54) METHOD AND DEVICE FOR THE COMPENSATION OF GEOMETRICAL ERRORS IN MACHINING MACHINERY

(75) Inventor: Bo Petterson, London (GB)

(73) Assignee: Hexagon Metrology AB, Stockholm (SE)

( * ) Notice: Subject to any disclaimer, the term of this patent is extended or adjusted under 35 U.S.C. 154(b) by 213 days.

(21) Appl. No.: 12/514,151

(22) PCT Filed: Nov. 16, 2007

(86) PCT No.: PCT/SE2007/050855
§ 371 (c)(1),
(2), (4) Date: Jul. 17, 2009

(87) PCT Pub. No.: WO2008/060238
PCT Pub. Date: May 22, 2008

(65) Prior Publication Data
US 2010/0042246 A1    Feb. 18, 2010

(30) Foreign Application Priority Data

Nov. 16, 2006  (SE) .................................. 200602437

(51) Int. Cl.
| G06F 19/00 | (2006.01) |
| --- | --- |
| G05B 19/18 | (2006.01) |
| G05B 19/04 | (2006.01) |
| G05B 15/00 | (2006.01) |
| G05B 19/00 | (2006.01) |
| G05D 1/02 | (2006.01) |
| G05D 1/10 | (2006.01) |
| G01B 5/30 | (2006.01) |
| G01B 7/16 | (2006.01) |
| G01B 5/004 | (2006.01) |
| G01B 3/00 | (2006.01) |

(52) U.S. Cl. ........ 700/245; 700/254; 700/262; 700/279; 700/302; 73/760; 73/763; 33/502; 33/503; 33/556

(58) Field of Classification Search .................. 700/245, 700/254, 262, 279, 302; 73/760, 763; 33/502, 33/503, 556
See application file for complete search history.

(56) References Cited

U.S. PATENT DOCUMENTS 4,763,276 A * 8/1988 Perreirra et al. .............. 700/262
(Continued)

FOREIGN PATENT DOCUMENTS

DE         195 06 403         9/1995
(Continued)

OTHER PUBLICATIONS

Yu-Jen Chiu et al., Self Calibration of a general hexapod manipulator with enhanced precision in 5-DOF motions; Mechanism and Machine Theory 39; 2004; 23 pages.*

(Continued)

Primary Examiner — Ronald Hartman, Jr.
(74) Attorney, Agent, or Firm — Young & Thompson

(57) ABSTRACT

A method to compensate geometrical errors in processing machines, in which a workpiece holder (8) is arranged such that it can be adjusted on the basis of measurement signals that have been received by being able to be rotated relative to a fixture (9) in the processing machine to which the workpiece holder is attached. A method for the alignment of a workpiece in processing machines, and an arrangement for the realization of the method are disclosed. The arrangement includes a workpiece holder (8), the angle of which relative to a fixture (9) in the processing machine to which the workpiece holder (8) is connected can be adjusted.

14 Claims, 2 Drawing Sheets

U.S. PATENT DOCUMENTS

| | | | |
|---|---|---|---|
| 5,357,450 A * | 10/1994 | Hemmerle et al. | 700/176 |
| 5,401,128 A * | 3/1995 | Lindem et al. | 409/132 |
| 5,525,885 A | 6/1996 | Sato | |
| 5,767,380 A * | 6/1998 | Haas | 73/1.79 |
| 5,768,759 A * | 6/1998 | Hudson | 29/407.04 |
| 5,870,834 A * | 2/1999 | Sheldon | 33/556 |
| 6,041,500 A * | 3/2000 | Terpstra | 29/889.21 |
| 6,453,211 B1 * | 9/2002 | Randolph et al. | 700/193 |
| 6,474,915 B1 | 11/2002 | Wildenberg | |
| 6,519,043 B1 * | 2/2003 | Wang | 356/614 |
| 6,529,852 B2 * | 3/2003 | Knoll et al. | 702/150 |
| 6,568,096 B1 * | 5/2003 | Svitkin et al. | 33/550 |
| 6,587,802 B1 * | 7/2003 | Schroder et al. | 702/91 |
| 6,637,737 B1 | 10/2003 | Beecherl et al. | |
| 6,681,151 B1 * | 1/2004 | Weinzimmer et al. | 700/259 |
| 7,386,367 B2 * | 6/2008 | Watanabe et al. | 700/259 |
| 7,533,574 B2 * | 5/2009 | McMurtry et al. | 73/763 |
| 7,852,031 B2 * | 12/2010 | Hon et al. | 318/572 |
| 7,904,202 B2 * | 3/2011 | Hoppe | 700/245 |
| 2002/0189120 A1 * | 12/2002 | Kaneda et al. | 33/636 |
| 2003/0083776 A1 * | 5/2003 | Schauer et al. | 700/218 |
| 2003/0233760 A1 * | 12/2003 | Lotze | 33/502 |
| 2005/0043849 A1 * | 2/2005 | Coleman et al. | 700/195 |
| 2005/0102118 A1 * | 5/2005 | Grupp et al. | 702/150 |
| 2005/0283989 A1 * | 12/2005 | Pettersson | 33/502 |
| 2006/0015211 A1 * | 1/2006 | Kolb et al. | 700/213 |
| 2006/0167587 A1 * | 7/2006 | Read | 700/245 |
| 2006/0196062 A1 * | 9/2006 | Nishibashi et al. | 33/502 |
| 2007/0051179 A1 * | 3/2007 | McMurtry et al. | 73/760 |
| 2007/0144022 A1 * | 6/2007 | MacManus et al. | 33/503 |
| 2007/0276534 A1 * | 11/2007 | Takahashi et al. | 700/193 |
| 2008/0039973 A1 * | 2/2008 | Ueno et al. | 700/245 |
| 2008/0148808 A1 * | 6/2008 | Vasiloiu | 73/1.79 |
| 2008/0184579 A1 * | 8/2008 | McFarland | 33/551 |

FOREIGN PATENT DOCUMENTS

| | | |
|---|---|---|
| DE | 100 11 804 | 9/2001 |
| WO | 99/55488 | 11/1999 |
| WO | 00/10768 | 3/2000 |
| WO | WO03/034165 * | 4/2003 |

OTHER PUBLICATIONS

Meng et al., Self-Calibration of Camera-Equipped Robot Manipulators, The International Journal of Robotics Research, vol. 20 No. 11, Nov. 2001, pp. 909-921 (13 pages); 2001.*

Zhuang et al., Autonomous Calibration of Hexapod Machine Tools, Journal od Manufacturing Science and Engineering, Feb. 2000, vol. 122, pp. 140-148 (9 pages).*

Ihara et al., Kinematic Calibration of a hexapod machine tool using circular test, Proceedings of the 2000 Japan USA Flexible Automation Conference Jul. 23-26 circa 2000, 4 pages.*

International Search Report dated Feb. 5, 2008, from corresponding PCT application.

* cited by examiner

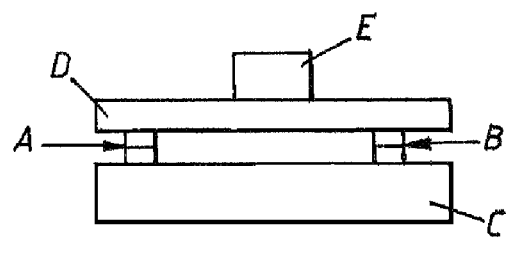
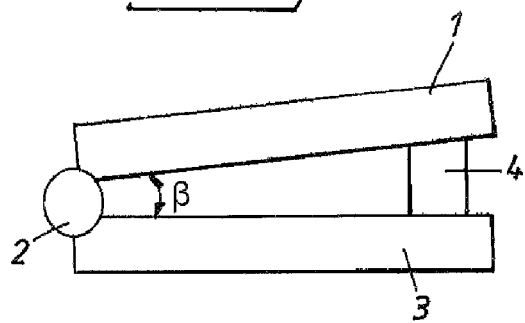
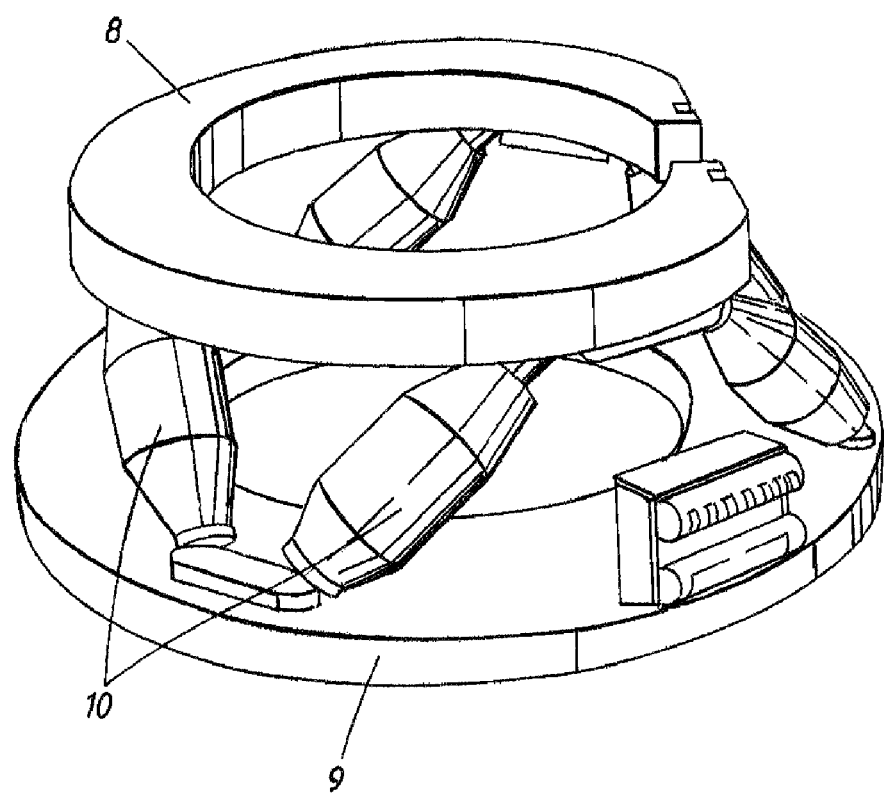

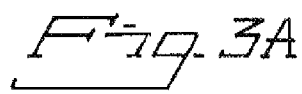
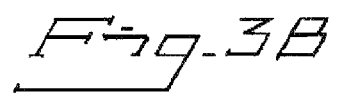
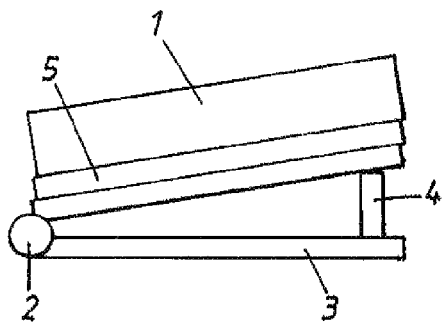
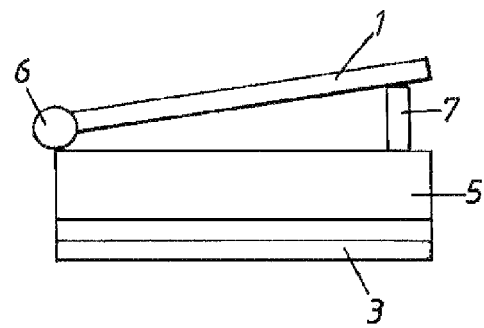
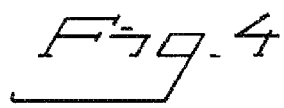
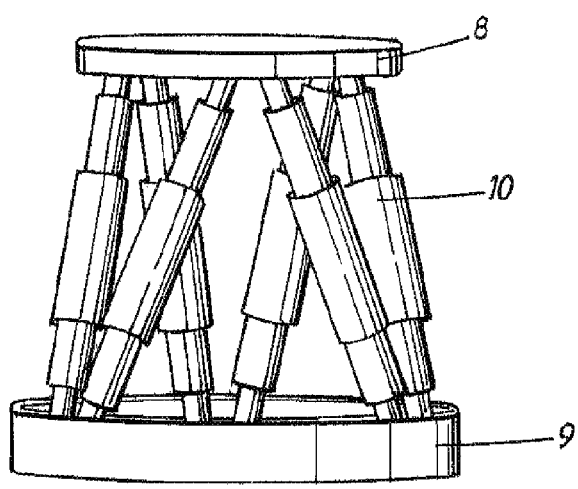

METHOD AND DEVICE FOR THE COMPENSATION OF GEOMETRICAL ERRORS IN MACHINING MACHINERY

BACKGROUND OF THE INVENTION

FIELD OF THE INVENTION

The present invention relates to a method to compensate for geometrical errors in processing machines such as CNC machines. The invention concerns also an arrangement with which geometrical errors in processing machines can be compensated.

DESCRIPTION OF THE RELATED ART

It is possible to measure geometrical errors in a processing machine while in motion through the use of, for example, a laser measurement system. It is possible also to conceive measurement of the errors in the machine by simulating cutting forces in the machine (the errors in this case will normally be greater than in the case when the machine is not under load). The errors that can be measured include deviations from linearity (normally it is scaling errors that are referred to, i.e. errors along the direction of the axis, the error is often a function of the position along the axis, i.e. in the case of, for example, the x-axis, the error=f(x)), deviations from straightness (normally it is errors orthogonal to the axis that are referred to, the error is normally divided into two components (for an x-axis the error consequently has components in the y and z directions), the error is often a function of the position along the axis, i.e. in the case of, for example the x-axis, the error=f(x)), angular errors (normally three types of error are referred to: yaw, pitch and roll (if we once again consider the x-axis, then yaw is a deviation in the xy angle, pitch is a deviation in the xz angle and roll is a rotation around the x-axis), the error is often a function of the position along the axis, i.e. in the case of, for example, the x-axis the error=f(x)), and orthogonality errors (normally it is the orthogonalities between the various axes that are referred to, i.e. xy, xz and yz), i.e. the errors that describe the movement of an axis. These errors can be determined for each one of the axes.

An example of how a roll error can arise is shown in FIG. 1. The roll error is generated by an error in parallelism between the layer surfaces A and B. The measurement enables one to obtain a model of the machine that describes the perfect machine and the actual deviations from it (either in its loaded or in its unloaded state).

In order to compensate a processing machine for these deviations, it is possible to achieve this if the machine has at least five axes, whereby the errors are fed into the system and the system takes the errors that have been fed in into consideration and compensates for them. This can be carried out in at least two different ways, one of which is that the partial program that is to be used during the processing is changed (i.e. that the pattern of movement is changed in such a manner that when the machine moves according to the new pattern then the movement will describe an "ideal movement"), the second manner is to introduce the correction into the control system of the machine (provided that the control system has been prepared such that this is possible, it is normally possible for the systems to handle only simple errors (orthogonality, linearity)). Most processing machines, however, not only those that are already in commercial use, but also most of those that are available for sale, have three axes, and compensation of angular errors is not possible for these, particularly if the errors change during the movement of the axes due to the tool mechanically taking up an erroneous angle relative to the workpiece.

SUMMARY OF THE INVENTION

It is therefore one aim of the present invention to achieve a solution for the problems described above, such that also angular errors can be compensated for in three-axis processing machines.

The above-mentioned aim of the invention is achieved with a method in which the workpiece holder is arranged such that it can be adjusted based on measurement signals that have been received, by it being possible at least to turn the workpiece holder relative to a fixture in the processing machine to which it is attached.

The term "workpiece holder" is here used to denote either a unit that holds the workpiece directly (a vice or similar) or a worktable that holds the workpiece indirectly (through a vice, for example). See the example in FIG. 1.

It is preferable that the workpiece holder is arranged such that it can be turned around at least one axis.

There is one further problem that can be solved in a simple manner with the suggested solution according to the invention, namely that of the physical alignment of a fitting. The physical alignment of a workpiece is normally a time-consuming and very important part of a processing procedure.

It is, therefore, a further aim of the invention to achieve a method that solves the problem with the need to physically align a workpiece.

This further method is achieved through measuring the physical position and orientation of the workpiece in the processing machine (through, for example, the use of a measurement probe in the machine), after which the measured values are compared with the nominal values and signals are subsequently sent (if there is any deviation between the nominal and measured values) to the workpiece holder to orient the workpiece such that it is oriented in the nominal position.

A further aim of the invention is to achieve a workpiece holder that allows the compensation of at least angular errors in a processing machine.

This further aim of the invention is achieved with a workpiece holder according to the invention, which workpiece holder can be angularly adjusted relative to a fixture in the processing machine to which the workpiece holder is attached.

According to one preferred embodiment, the workpiece holder is attached to the fixture with the aid of adjustable rods that can be compressed or extended, which means that the workpiece holder can be both displaced and oriented at freely chosen values relative to the base.

BRIEF DESCRIPTION OF THE DRAWING FIGURES

The invention will now be described in more detail in the form of a pair of embodiments, illustrated with the aid of the attached drawings, in which FIG. 1 shows schematically the principle for how a roll error arises in a processing machine, FIG. 2 shows schematically the principle and a very simple adjustment means for the compensation of angular errors of a workpiece holder relative to a fixture in a processing machine, FIGS. 3A and 3B show schematically the principle for an adjustment means for rotation around two axes, namely in a frontal view in FIG. 3A and in a side view in FIG. 3B that is rotated 90° relative to FIG. 3A, FIG. 4 shows a first embodiment of a workpiece holder according to the invention, and FIG. 5 shows a second embodiment of a workpiece holder according to the invention.

DETAILED DESCRIPTION OF THE INVENTION

FIG. 1 shows the principle arrangement of a processing machine, comprising a machine base C that supports a worktable D through two bearing surfaces A and B. A workpiece holder, such as a vice E, is located, in turn, on this worktable, which workpiece holder holds a workpiece during the processing of the workpiece by the processing machine.

FIG. 2 thus shows the principle and a very simple adjustment means for carrying out the compensation of angular errors. A workpiece holder 1, shown here in the form of a disk, is connected by a pivot joint 2 to a fixture 3, which may be a fixture that is in turn mounted in a processing machine, not shown in the drawings, in a manner that allows rotation. In order to manoeuvre the workpiece holder 1 relative to the fixture 3, in order to turn it around the pivot joint 2, an actuator 4 is, furthermore, arranged between the workpiece holder 1 and the fixture 3. The actuator 4 thus achieves rotation of the workpiece holder 1 relative to the fixture 3, and it thus achieves a change in the angle β between them.

It is possible in principle to achieve an arrangement that can compensate angular errors between the processing machine and the workpiece holder, independently of the direction of the angular error, by further arranging a plate 5 and a pivot joint 6 connected to the fixture in FIGS. 3A and 3B, with this pivot joint 6 placed perpendicularly to the pivot joint 2 shown.

Thus, the surface normal of the workpiece holder 1 can, according to FIGS. 3A and 3B, take up a freely chosen angle relative to the fixture 3 by changing the lengths of the actuators 4 and 7. All three types of angular error can be dealt with by placing the complete package on a round table. The round table can be placed onto a freely chosen plate (1, 3 or 5).

FIG. 4 shows an example of how such an arrangement can be designed in practice, without requiring any additional plate or two pivot joints placed perpendicularly. A workpiece holder 8 in this case is connected to a fixture 9 with the aid of six rods 10 that can be compressed and extended. The rods 10 that can be compressed and extended are arranged such that neighbouring rods are tilted in opposite directions. The rods 10 that can be compressed and extended can be manoeuvred by electrical, hydraulic or pneumatic means, such that each rod can be adjusted independently of the other rods.

The rods 10 that can be compressed and extended thus function, according to the preferred embodiment, both as pivot joint and as actuator in the principle for compensation according to the invention described above.

It is thus possible to achieve a freely chosen angular setting by manoeuvring the rods 10 that can be compressed and extended. It is also possible in this case to achieve displacement of the workpiece holder 8 relative to the attachment 9.

FIG. 5 shows a further example of a workpiece holder 8 according to the invention, which is, as is the one in FIG. 4, attached to a fixture 9 with the aid of six rods 10 that can be compressed and extended. This fixture 9 may be the part that is attached to the processing machine.

The arrangement of rods 10 that can be compressed and extended that has been described above can achieve a displacement and a rotation of the workpiece holder relative to the fixture such that all angular errors can be compensated.

The workpiece holder may be any suitable means for holding a workpiece, such as, for example, a table, a vice or a chuck.

The invention claimed is:

1. A method to compensate geometrical errors in processing machines, comprising:
   arranging a workpiece holder (1, 8) such that the workpiece holder (1, 8) on a basis of measurement signals that have been received of angular errors changing during movement of axes of the processing machine can be adjusted by being rotated relative to a fixture (3, 9) in the processing machine to which the workpiece holder is attached; the arranging being performed by:
   measuring a physical position and orientation of a workpiece in the processing machine;
   comparing a result of the measuring with nominal values; and
   compensating for any deviations by adjusting the workpiece holder,
   wherein the workpiece holder is arranged such that the workpiece holder can be rotated around at least two axes, essentially perpendicular to each other.

2. The method according to claim 1, wherein the workpiece holder is connected to the fixture via a pivot joint.

3. The method according to claim 2, wherein an actuator is arranged between the workpiece and the fixture such that the workpiece can rotate relative to the fixture.

4. The method according to claim 1, wherein the workpiece holder is attached to the fixture via six adjustable rods that can be compressed and extended.

5. A method to compensate for alignment of a workpiece in processing machines, comprising:
   arranging a workpiece holder (1, 8) such that the workpiece holder can be adjusted on a basis of measurement signals that have been received, the workpiece holder being able to be rotated relative to a fixture (3, 9) in the processing machine to which the workpiece holder is attached; the arranging being performed by:
   measuring a physical position and orientation of the workpiece in the processing machine;
   comparing a result of the measuring with nominal values; and
   compensating for any deviations by adjusting the workpiece holder,
   wherein the workpiece holder is arranged such that the workpiece holder can be rotated around at least two axes, essentially perpendicular to each other.

6. The method according to claim 5, wherein an actual alignment of the workpiece is first measured in the processing machine and measurement signals based on a difference between the measured orientation and the nominal orientation are subsequently sent to a control system.

7. The method according to claim 5, wherein the workpiece holder is connected to the fixture via a pivot joint.

8. The method according to claim 7, wherein an actuator is arranged between the workpiece and the fixture such that the workpiece can rotate relative to the fixture.

9. The method according to claim 5, wherein the workpiece holder is attached to the fixture via six adjustable rods that can be compressed and extended.

10. An arrangement with which geometrical errors in processing machines can be compensated, comprising:
    a workpiece holder (1, 8) an angle of which, relative to a fixture (3, 9) in the processing machine to which the workpiece holder is attached, on a basis of measurement signals that have been received of angular errors changing during movement of the axes of the processing machine so that the processing machine can be adjusted, the arrangement being configured such that a physical position and orientation of a workpiece in the processing machine can be measured, a result of the measuring with nominal values can be compared, and compensating for any deviations by adjusting the workpiece holder, wherein the workpiece holder is arranged such that the workpiece holder can be rotated around at least two axes, essentially perpendicular to each other.

11. The arrangement according to claim 10, wherein the workpiece holder (8) is attached to the fixture (9) with the aid of adjustable rods (10) that can be compressed and extended.

12. The arrangement according to claim 11, wherein neighboring rods (10) that can be compressed and extended are arranged such that they tilt in opposite directions.

13. The arrangement according to claim 10, wherein the workpiece holder (8) is attached to the fixture (9) with the aid of six adjustable rods (10) that can be compressed and extended.

14. The arrangement according to claim 13, wherein neighboring rods (10) that can be compressed and extended are arranged such that they tilt in opposite directions.

* * * * *